Dec. 25, 1928.
J. R. REYBURN
1,696,255
CROSS CHAIN FOR VEHICLE NONSKID DEVICES
Filed July 8, 1925
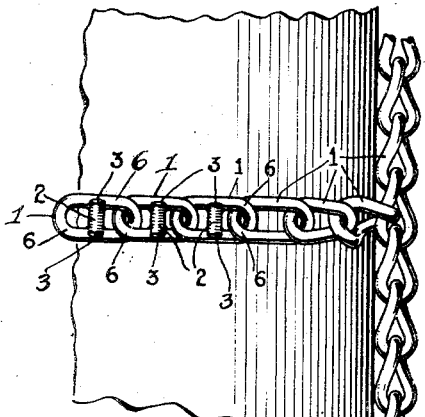
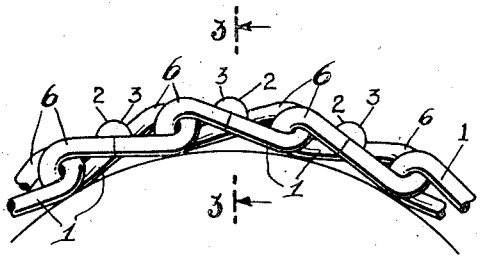
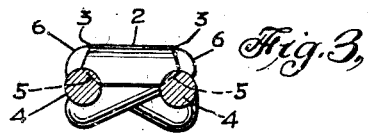
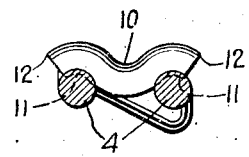
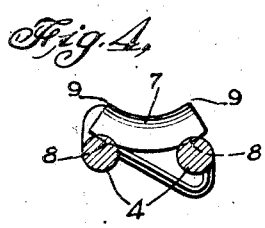
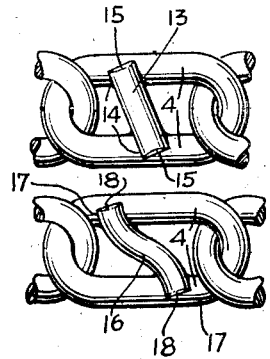
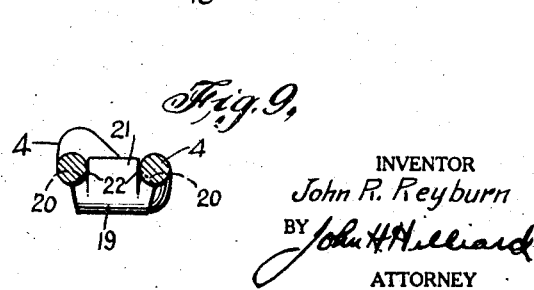
INVENTOR
John R. Reyburn
BY
ATTORNEY Patented Dec. 25, 1928.

1,696,255

UNITED STATES PATENT OFFICE.

JOHN R. REYBURN, OF FAIRFIELD, CONNECTICUT, ASSIGNOR TO AMERICAN CHAIN COMPANY, INC., A CORPORATION OF NEW YORK.

CROSS CHAIN FOR VEHICLE NONSKID DEVICES.

Application filed July 8, 1925. Serial No. 42,137.

This invention relates to cross-chains for non-skid devices for vehicle wheels and is shown for convenience of illustration embodied in a conventional type of cross-chain, each link of which is twisted on its longitudinal axis to such an extent that the two ends lie in planes at a considerable angle from each other, usually from 60° to 90°. This chain is commonly known as curb chain. The particular form of chain, however, is not an essential part of the invention and other forms may be used that will serve the purpose as well as the curb chain.

More particularly, one of the objects of the invention is to provide additional contacts over and above those supplied by the chain itself, and which will not only share with the chain itself the wear incident to ordinary use, but will prevent sliding to a substantially greater degree than any of the previous devices known to me. The method employed in preventing sliding over smooth or slipper surfaces consists in the incorporation in the chain of an additional contact body, of such characteristics, more particularly configuration, as to present an edge in the direction of the road surface which will effectively engage the minor irregularities above referred to and penetrate the smooth surfaces of paved or icy roads to an extent that will effectively promote traction.

At the same time, it is desirable that the retarding functions of the structure should not be exerted against the tire itself, for the reason, in the first place, that it would cut and abrade the tire, and in the second place, because, regardless of the nature of the tire-contact surface of the tread, it is desirable that the latter be free to creep at a very low rate of speed about the periphery of the tire in order to reduce wear on the latter.

Another feature which is desirable in conjunction with the edge-like character of the retarding means is that this edge-like conformation shall persist in spite of the wear, at least until the chain structure has become so weakened as to render the tread as a whole useless; and it is another of the objects of the present invention to provide such a feature.

Another object of the invention is to provide an open link with a separately formed section of wire or other suitable stock connected with the strands of the link in such fashion as to constitute an integral bridge, or stud, serving at the same time as a tie, as a strut, and as a contact body at a region of said link relatively free otherwise from exposure to tractive contact, this integral connection being preferably formed by welding the stud or bridging member to each strand. It may be formed at a point on one of the strands, at least, where there is a welded joint in the strand, so that the weld of the bridge to the strand extends across the weld uniting the contiguous ends of the strand, and serves as a complementary weld uniting said ends to each other and also uniting them severally to the opposite strand.

I have accordingly provided a contact body that will offer a maximum of resistance to bending, crushing, breakage, loosening and dislocation, and which is cheap to manufacture and easily incorporated in the chain structure.

In actual practice, the tread of non-skid devices is usually of such proportions that a length comprising from four to seven links usually suffices for a single tread member. The number of links, however, is not invariable and depends upon the cross-section diameter of the tire and the dimensions of the particular chain used. However, under the usual circumstances only a few (perhaps two or three) of the links of a particular tread member regularly comes in contact with the road surface, and therefore, in drawings accompanying this application, the sections of tread are shown with only two or three of the links provided with additional contact members. This, however, is merely adapted from conventional methods, and it is to be understood that the number of links of a particular length of tread that may be provided with additional contact bodies is in no wise a part of this invention and may be varied to suit the particular needs of the user.

Referring to the drawings:—

Figure 1 is a fragmentary plan view of a length of cross-chain, shown in place on a tire, and having three of the links provided with contact bodies.

Figure 2 is a side view of a portion of the cross-chain shown in Figure 1, isolated, and shown on a larger scale.

Figure 3 is a cross-section view on the line 3—3 of Figure 2.

Figure 4 and Figure 5 are sectional views of modifications.

Figure 6 and Figure 7 are plan views of other modifications.

Figure 8 is an outer plan view of still another modification of the invention, and Figure 9 is a view in section on the line 9—9 of Figure 8.

In Figure 1, there is shown a length of cross-chain of the character above referred to as a curb chain, made up of the links 1. Certain of the links are each provided with a contact body which includes the stud 2 extending in such direction that when the tread member is in contact with the road surface the edge 3 will encounter minor irregularities of the surface and, under the impressed weight of a moving vehicle, even on hard roads penetrate to a greater or less extent the surface itself.

It should be realized that under tractive conditions the inner portion of a tread member is being forced horizontally in one direction by the action of the tire, while the outer portion is being forced horizontally in the opposite direction by the action of the road surface. The resultant involves a couple consisting of these two forces acting at a distance apart roughly represented by the vertical dimension of the tread member. This causes the tread member to tend to roll in the same direction and in the same plane in which the wheel is rolled and brings into action the edges just referred to.

In view of the fact that it is usually desirable that tread members of the character shown in the drawings shall be interchangeable as to end connections and shall be capable of supporting traction both forwardly and rearwardly, it is preferable that the contact body should exhibit two of these edges 3 extending in opposite directions.

The preferred way of making the contact body or stud 2 consists as shown of welding a short section of half-round wire to the strands 4 across the minor diameter of the link, the welds being indicated at 5, (see Figure 3) and making the edges 3 of the studs as salient as possible. This arrangement has the further advantage that each stud lies in an uncurved portion of the link and thus each member of the tread exhibits contact surfaces 2 and 6 aggregating substantially double the usual area, and which may if desired be substantially flush with each other. Each member of the tread is therefore capable of being subject to approximately twice the wear of the conventional chain link, assuming that the stock of the chain and studs is of the same quality and that the contact areas are the same, which in point of fact is approximately the case in the particular embodiments of the inventions which I have found most desirable. These relative quantities, however, are susceptible of variation, according to the desire of the manufacturer or user. The fact which I wish to be noted, however, is that the number and area of the contact surfaces are substantially increased, which results in an increased life for the structure as a whole and also, by virtue of the character of the additional contact surfaces, in increased traction.

Various expedients may be adopted to secure the desired salient character of the edges, and in Figure 4 I have shown a modification in which the contact body 7 is formed of round wire welded to the link strands 4 at points 8 and cut off at right angles from the stock, being bowed as indicated so that the ends 9 present sharply defined circular edges in each direction.

In the modification shown in Figure 5 the contact body 10 is welded at 11 to the strands 4 of the link and as shown is bowed in the middle and reversely curved at each end, so that while the stock is cut off square at each end of the contact body, the latter hugs the strands on its lower surface, giving a larger area of contact for the welds and presents in each direction an edge 12 as a salient edge nearly at right angles to the direction of rotation of the tire.

In the modification shown in Figure 6, the additional contact member consists of a section of stock 13 bridging the strands 4 of the link somewhat diagonally from one uncurved portion to the other and preferably welded to the link as indicated at 14. In this form the inclined sides of the link may serve to increase the tractive effect, and the effective area of the edges 15 is not proportionately diminished.

In the modification shown in Figure 7, the contact body 16 is of ogee form, bridging the strands 4 of the link at approximately their lowest points 17 where the contact body is welded, and the tractive effect is very considerably increased by the extent of lateral surface presented, while the edges 18 are brought more nearly into a position at right angles to the direction of travel.

The forms illustrated in Figures 5 and 7, of course, require the use of somewhat more stock than the forms illustrated in Figures 1, 2, 3, 4, and 6, and it is to be observed that the last mentioned forms are notable for the tractive efficiency secured with the use of a minimum amount of stock, as compared with the efficiency of the simple curb chain described at an earlier point in this specification.

In the modification illustrated in Figures 8 and 9, a contact member 19 is illustrated welded at 20 to the strands 4 of each link, preferably being formed of half-round stock with an extension 21 which is likewise welded at 22 and 23 between and to the strands 4, preferably extending across the welded joint shown at 24, this stud constituting an extremely strong and serviceable member for the purpose described, as the additional material afforded by the shank of this T-shaped contact member with its welded connection unites the strands of the link and the contact member in such a fashion as to prolong the life of the link notably.

Further changes in modification in the embodiment of my invention may be made, all of which are intended to be covered by the appended claims.

Having thus described my invention, I claim:—

1. In a cross-chain for non-skid devices for vehicle wheels, a chain link and an additional contact body therefor, said contact body comprising a separately formed section of stock bridging said link at an angle to its major diameter and presenting edges in opposite directions transversely of said link to engage the road surface and afford traction in either of two directions.

2. A non-skid chain provided with a transverse non-skid calk of sufficient length only to bridge the sides of the chain link and welded to the outer surface of each side.

3. A non-skid chain link having an attached transverse non-skid bar or calk consisting of a bar or rod of metal of sufficient length only to extend across the link and engaging the outer surface of the sides and welded to said outer surface.

4. A non-skid chain link having an attached calk consisting of a bar of sufficient length only to extend across the link on the outside thereof and welded to the side portions of the same, said bar being of sufficient thickness to afford practically the whole non-skid effect.

5. In a cross-chain for non-skid devices for vehicle wheels, a twisted chain link, having salient road-engaging strand portions, and a bridging calk integrated metallically with said link whereby it is constituted a permanent element of the link and presenting sharp edges at substantially the same level as the salient strand portions, and in the direction in which the force of traction is exerted, said edges projecting in substantially opposite directions with respect to each other, said contact body being adapted to be turned with the cross-chain, as the latter rolls between the tire and road in use, into position to cause one or the other of said sharp edges to engage the road surface and afford traction in either of two directions.

In testimony whereof, I have signed this specification.

JOHN R. REYBURN.